US006911662B2

United States Patent
Kim et al.

(10) Patent No.: US 6,911,662 B2
(45) Date of Patent: Jun. 28, 2005

(54) CHEMICAL-MECHANICAL POLISHING APPARATUS AND METHOD FOR CONTROLLING THE SAME

(75) Inventors: Kyoung-Woo Kim, Gyeonggi-do (KR); Yu-Sin Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 10/372,877

(22) Filed: Feb. 26, 2003

(65) Prior Publication Data

US 2003/0178587 A1 Sep. 25, 2003

(30) Foreign Application Priority Data

Mar. 21, 2002 (KR) ................................ 10-2002-0015392

(51) Int. Cl.[7] ................................................. G02B 6/43
(52) U.S. Cl. ..................................... 250/559.27; 451/6
(58) Field of Search .......................... 250/559.27; 451/5, 451/6; 356/630

(56) References Cited

U.S. PATENT DOCUMENTS

| | | | |
|---|---|---|---|
| 5,609,511 A | 3/1997 | Moriyama et al. | |
| 5,643,046 A | 7/1997 | Katakabe et al. | |
| 5,722,875 A | 3/1998 | Iwashita et al. | |
| 6,190,234 B1 | 2/2001 | Swedek et al. | |
| 6,312,557 B1 | 11/2001 | Marsh | |
| 2001/0012108 A1 | 8/2001 | Holzapfel et al. | |
| 2002/0155789 A1 * | 10/2002 | Bibby et al. | ............. 451/6 |

FOREIGN PATENT DOCUMENTS

| | | |
|---|---|---|
| GB | 2 337 476 A | 11/1999 |
| WO | WO 98/05066 | 2/1998 |
| WO | WO 01/42866 A1 | 6/2001 |
| WO | WO 02/10729 A1 | 2/2002 |

* cited by examiner

Primary Examiner—David Porta
Assistant Examiner—Tony Ko

(57) ABSTRACT

In a chemical-mechanical polishing apparatus and a method for controlling the same, a table of an initial thickness of a layer to be polished concerning a detected light quantity of an endpoint detecting member is prepared in accordance with a polishing process recipe of the layer to be polished. The polishing process recipe of the layer is inputted, and a light quantity reflected from the layer is detected using the endpoint detecting member by projecting a light onto a semiconductor wafer. A thickness of the layer is calculated before the polishing process from a detection signal as the detected light quantity with reference to the table of the initial thickness of the layer concerning the detected light quantity. A polishing time is calculated from the calculated thickness before the polishing process to a desired thickness. An endpoint is detected by discounting the calculated polishing time while polishing the layer to be polished. Then, the polishing process is stopped when the endpoint is detected. An accurate control of a polishing endpoint can be achieved by simply adding a program to a controller of a CMP apparatus, and conditions and an efficiency of the operation can be improved.

12 Claims, 12 Drawing Sheets

CHEMICAL-MECHANICAL POLISHING APPARATUS AND METHOD FOR CONTROLLING THE SAME

CROSS REFERENCES TO RELATED APPLICATIONS

This application claims priority under 35 U.S.C. §119 from Korean Patent Application No.2002-15392, filed on Mar. 21, 2002, the contents of which are hereby incorporated by reference in their entirety as if fully set forth herein.

BACKGROUND AND SUMMARY

1. Technical Field

The present invention relates to a chemical-mechanical polishing apparatus of a semiconductor wafer and a method for controlling the same, and more particularly to a chemical-mechanical polishing apparatus for performing an endpoint detection (EPD) in a chemical-mechanical polishing process, and a method for controlling the same.

2. Description

An integrated circuit is generally formed on a substrate by a sequential deposition of a conductive layer, a semi-conductive layer, or an insulation layer on a silicon wafer. After each layer is deposited, each layer is etched in order to form a circuit. As a series of layers are sequentially deposited and etched, a peripheral portion or an uppermost face of the substrate (that is, an exposed face of the substrate) becomes uneven. When the substrate has a non-planar face, some problems may occur during a photolithographic step of an integrated circuit fabrication process. Hence, the face of the substrate should be periodically planarized.

A chemical mechanical polishing (CMP) process has been accepted for planarizing the substrate. In the CMP process, the substrate must be mounted on a carrier head or a polishing head. The exposed face of the substrate is disposed so that the substrate corresponds to a rotating polishing pad. The polishing pad may be a standard pad or a fixed-abrasive pad. While the standard pad has a durable rugged face, the fixed-abrasive surface pad includes abrasive particles held in a containment media. The carrier head provides a controllable load, i.e., pressure, to the substrate in order to push the substrate against the polishing pad. When the standard pad is applied, a slurry for polishing, including at least one chemically reactive agent and abrasive particles, is supplied to a surface of the polishing pad.

The effectiveness of the CMP process can be measured by a polishing rate of the substrate, an end result of a polished surface of the substrate (that is, an absence of a small-scaled roughness), and a flatness of the polished surface of the substrate (namely, an absence of a large-scaled roughness). The polishing rate, the end result, and the flatness of the substrate are determined according to a combination of the polishing pad and the slurry, a configuration of the carrier head, a relative speed between the substrate and the polishing pad, and a force pressing the substrate against the pad.

In order to examine the effectiveness of polishing tools and the polishing process, a wafer with one or more layers having no patterns (a so-called "blank" wafer) is polished in a tool/process qualification step. After such a wafer is polished, a thickness of a remaining layer is measured at several points of the polished surface of the substrate. The thickness variations of the layer can provide measurements of a wafer surface uniformity, and a relative polishing rate in different regions of the substrate.

One approach to determine the thickness of a substrate layer and the polishing uniformity is to examine the polished substrate after removing the substrate from the polishing apparatus. For example, the substrate is transferred to a metrology station where the thickness of the substrate layer is measured with an ellipsometer. Disadvantageously, such a method requires a lot of time, high cost, and expensive metrology equipment.

One important point for the CMP process is to determine whether or not the polishing process is exactly completed, i.e., whether or not the layer on the substrate layer is planarized to have a desired flatness or thickness. The polishing rate of the layer on the substrate may be varied according to the initial thickness of the layer on the substrate, the composition of the slurry, the material and the condition of the polishing pad, the relative speed between the polishing pad and the substrate, and the force pressing the substrate against the polishing pad. A variation of the polishing rate may cause variations in the time required to reach a polishing endpoint. Therefore, the polishing endpoint cannot be determined merely as a function of the polishing time.

One approach for detecting the polishing endpoint is to remove the substrate from the polishing pad, and then examine the substrate. When the substrate does not meet desired specifications, the substrate is reloaded into the CMP apparatus for a further processing. Alternatively, an examination for the substrate can reveal that an excess amount of the layer has been removed, which renders the substrate unusable. That is, a method is needed for detecting whether or not the desired flatness or thickness had been achieved in-situ.

Several methods have been developed for detecting the polishing endpoint in-situ. Most of those methods involve monitoring parameters related to surface conditions of the substrate, and then detecting the polishing endpoint when the parameters are abruptly changed. For example, when an insulation layer or a dielectric layer is polished to expose a metal layer formed beneath the insulation layer or dielectric layer, a friction coefficient and a reflectivity of the substrate may be changed abruptly when the metal layer is exposed.

In an ideal system where the monitored parameters are abruptly changed at the polishing endpoint, such polishing endpoint detection methods are acceptable. However, as the substrate is polished, the condition of the polishing pad and the composition of the slurry composition may be varied at an interface between the polishing pad and the substrate. Such variations may imitate a condition where the polishing endpoint is reached, or falsely indicate that the underlying metal layer is not exposed. Additionally, such endpoint detection methods may not be effective when a planarization step is performed only, or when an underlying layer and an overlying layer have similar physical properties.

U.S. Pat. No. 6,190,234 (issued to Boguslaw Swedek et al.) discloses an endpoint detection method with light beams of different wavelengths.

In the above-mentioned U.S. Patent, a pair of endpoint detecting devices, which project light beams with different wavelengths to a semiconductor wafer, is provided in order to measure a time to finish a polishing process more accurately and reliably.

According to the above-mentioned U.S. Patent, an initial thickness of a polishing layer can be calculated as a function of a thickness between one peak and another peak of the light beams, a phase difference between the light beams, and one peak and another peak period of the light beams in a reflection rate trace of the polishing layer by light beams with a single wavelength. However, such a method is not accurate, and thus the initial thickness can be more accurately provided by deducting a closeness of one peak and another peak period from the reflection rate trace of light beams with different wavelengths.

However, because the method disclosed in the above-mentioned U.S. Patent should utilize two endpoint detecting devices for calculating an accurate thickness, the method may hardly applied to the conventional CMP apparatus.

Also, according to the U.S. Patent, a complicated processing program is required for controlling the two endpoint detecting devices, for tracing a reflection ratio, and performing a calculation, so the cost of the polishing process may increase.

In order to solve above-mentioned problems it would be desirable to provide a chemical-mechanical polishing apparatus including a single endpoint detecting device, which can measure a thickness more accurately and can be employed in the conventional devices easily by changing software, and a method for controlling the same.

It would also be desirable to provide a method for controlling the above chemical-mechanical polishing apparatus.

In accordance with one aspect of the present invention, there is provided a method for controlling a chemical-mechanical polishing (CMP) apparatus for polishing a layer to be polished, formed on a lower layer on a semiconductor wafer. First, an "endpoint detection light quantity table" of initial light quantities detected by an endpoint detecting means and corresponding initial thicknesses of a layer to be polished, according to a polishing process recipe of the layer to be polished, is prepared. Next, the polishing process recipe of the layer to be polished is stored into a storing means. Then, a light is projected onto the semiconductor wafer, including the layer to be polished, and an initial light quantity reflected from the layer to be polished is detected by the endpoint detecting means. Then, before the polishing process is initiated, a thickness of the layer to be polished is calculated from a detection signal corresponding to the detected initial light quantity by referring to the entries in the "endpoint detection light quantity table." Before the polishing process begins, the polishing time is calculated as the time to polish the layer from the calculated initial thickness to a desired final thickness. Then, the layer is polished by the CMP apparatus. While the layer is being polished, the remaining polishing time is counted down or decremented. An endpoint is detected when the remaining polishing time is zero and the polishing process is stopped.

In accordance another aspect of the present invention, there is provided a chemical-mechanical polishing apparatus for polishing a layer to be polished formed on a lower layer on a semiconductor wafer. The apparatus includes storing means for storing an endpoint detection light quantity table of initial light quantities detected by an endpoint detecting means and corresponding initial thicknesses of a layer to be polished, in accordance with a polishing process recipe for the layer to be polished. The apparatus also includes inputting means for inputting the polishing process recipe of the layer to be polished into the storing means and endpoint detecting means for detecting a light quantity reflected from the layer to be polished by projecting a light to the semiconductor wafer. the apparatus further includes controlling means for calculating the initial thickness of the layer to be polished from the detected light quantity data with reference to the end point detection light quantity table, for calculating a polishing time to polish the layer to be polished from the calculated initial thickness to a desired final thickness, for detecting an end point by counting down the calculated polishing time while polishing the layer to be polished, and for stopping polishing the layer when the end point is detected.

Beneficially, a CMP apparatus according to one or more aspects of the present invention includes one endpoint detector, and calculates an initial thickness of a layer to be polished accurately by using a light quantity data detected by the one end point detector. In addition, the CMP apparatus controls a polishing process and determines a polishing endpoint automatically by calculating a polishing time by using the calculated initial thickness of the layer to be polished. Therefore, an accurate control of a polishing endpoint can be achieved by simply adding a program to a controller of a conventional CMP apparatus, and conditions and an efficiency of the operation can be improved.

BRIEF DESCRIPTION OF THE DRAWINGS

The above and other advantages of the present invention will become more apparently by describing in detail an exemplary embodiment thereof with reference to the accompanying drawings, in which.

DETAILED DESCRIPTION

Figure 1:
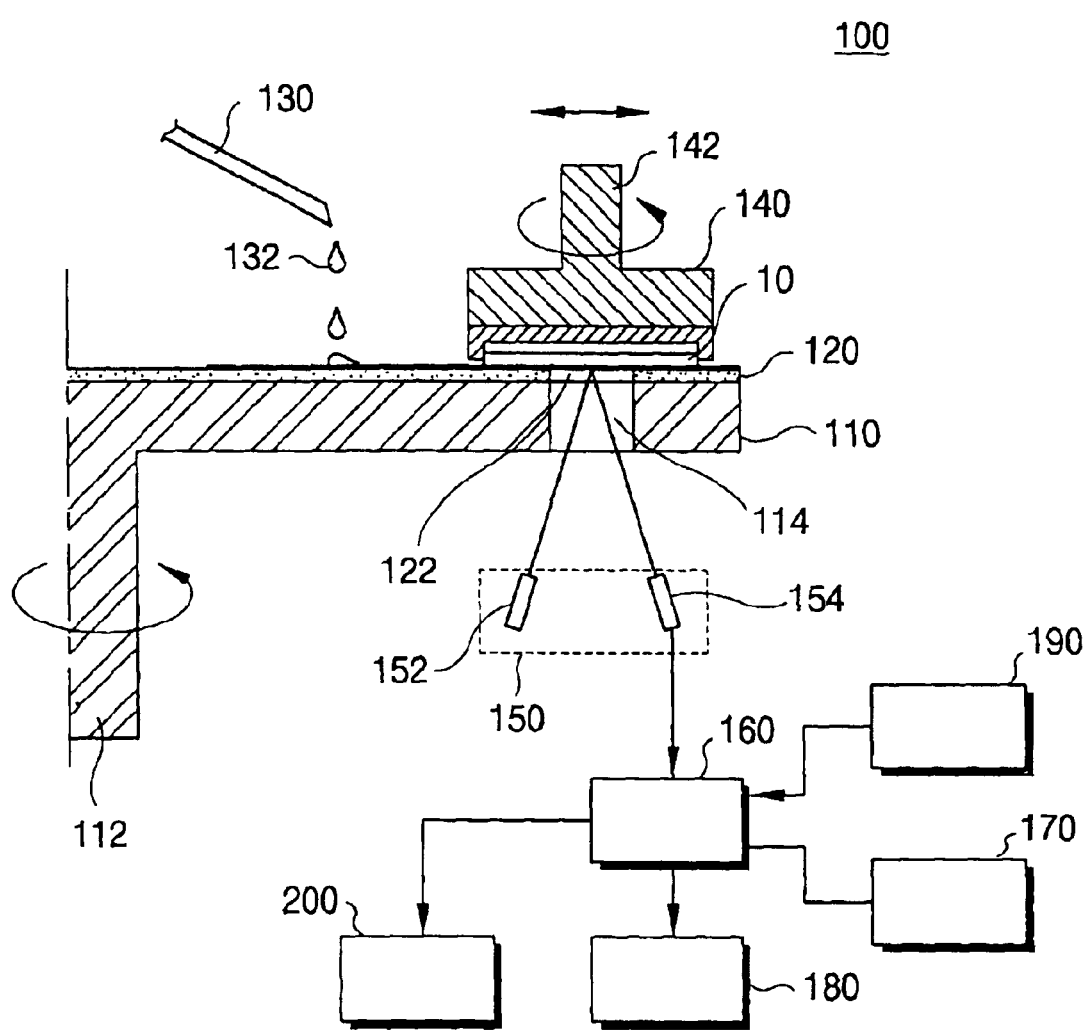
FIG. 1 is a schematic cross-sectional view illustrating a chemical-mechanical polishing apparatus.

FIG. 1 is a schematic cross-sectional view illustrating a chemical-mechanical polishing apparatus.

Referring FIG. 1, a CMP apparatus 100 includes a rotation platen 110 on which a polishing pad 120 is disposed. When a substrate 10 is a disc having a diameter of 8 inches (200 mm) or 12 inches, diameters of the rotation platen 100 and the polishing pad 120 are about 20 inches or 30 inches, respectively. The rotation platen 110 is connected to a driving motor (not shown), and then rotated. Though the driving motor rotates the rotation platen 110 at a speed of approximately 30 to 200 revolutions per minute in most polishing processes, the driving motor can rotate the rotation platen 110 at a lower or higher rotation speed.

The polishing pad 120 generally includes a base layer contacting a surface of the platen 110, and a polishing layer. Also, the polishing layer is generally harder than the base layer. However, one kind of polishing pad 120 has a polishing layer only without the base layer. The polishing layer can be comprised of an open cell foamed polyurethane or a sheet of polyurethane with a grooved surface. The base layer can be comprised of compressed felt fibers leached with urethane. Rodel, Inc., (Newark, Del.) provides a two-layered polishing pad, with a polishing layer comprised of IC-1000 and a base layer composed SUBA-4 (IC-1000 and SUBA-4 are product names of Rodel, Inc.).

A slurry 132 containing a reactive agent (e.g., deionized water for an oxide polishing), and a chemically reactive catalyst can be supplied to the surface of the polishing pad 120 by a slurry supply port or a combined slurry/rinse arm 130. When the polishing pad 120 is the standard pad, the slurry 132 can include abrasive particles such as silicon oxides for the oxide polishing.

A carrier head 140 is connected to a rotation motor, and then the carrier head 140 independently rotates centering around its central axis 142. In addition, a radial driving motor (not shown) moves a slider to laterally oscillate the carrier head 140 in left and right directions. The rotation platen 110 rotates centering around its central axis 112 while the carrier head 140 rotates about its central axis 142 and moves laterally across the surface of the polishing pad 120.

The carrier head 140 performs several mechanical functions. In general, the carrier head 140 supports the substrate 10 against the polishing pad 120, distributes a reduction pressure across a backside of the substrate 10. Also, the carrier head 140 transmits a torque from a driving axis to the substrate 10, and holds the substrate 10 in order to prevent the substrate 10 from sliding downward with respect to the carrier head 140 during a polishing process.

Figure 2:
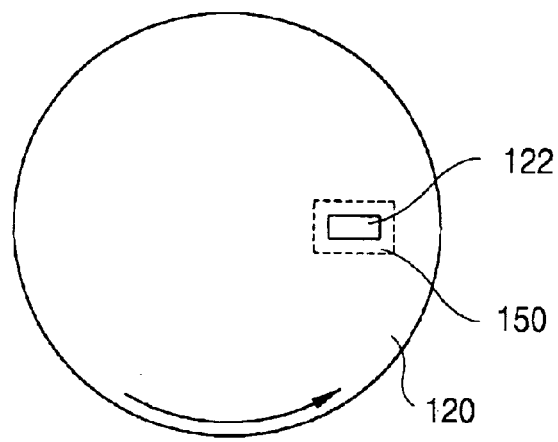
FIG. 2 is a top view showing a polishing pad disposed on a rotation platen in FIG. 1.

FIG. 2 is a top view showing the polishing pad 120 disposed on the rotation platen in FIG. 1.

Referring to FIGS. 1 & 2, a hole 114 is formed through the rotation platen 110, and a transparent window 122 is formed in the polishing pad 120 disposed on the hole 114. The hole 114 and the transparent window 122 are positioned so that the substrate 10 can be observed through the hole 114 and the transparent window 122 during a rotation of the rotation platen 110 regardless of the moving position of the carrier head 140.

An endpoint detecting member 150 for an interferometer measurement of a thickness of the substrate 10 and a polishing rate of the substrate 10 is disposed under the rotation platen 110 where the transparent window 122 is formed. The endpoint detecting member 150 can be fixed to the rotation platen 110 so that the endpoint detecting member 150 rotates with the rotation platen 110, thereby maintaining a fixed position with respect to the transparent window 122.

The endpoint detecting member 150 is an "off-axis" system in which light is applied to the substrate 10 at a non-normal incidence angle. The endpoint detecting member 150 includes a light source 152, and a sensor or a detector 154 such as a photo detector.

The light source 152 generates a light beam 151 that propagates through the transparent window 122 and the slurry 132 on the polishing pad 120 to be applied to an exposed surface of the substrate 10. The light beam 151 is projected from the light source 152 to the substrate 10 by an angle ($\alpha$1) with respect to an axis perpendicular to the surface of the substrate 10. According to one embodiment, the light source 152 is a laser generating device that generates a laser beam with a wavelength of about 600–700 nm, for example, 670 nm.

The substrate 10 can be observed through the transparent window 122 during the rotation of the rotation platen 110.

The CMP apparatus 100 includes the endpoint detecting member 150 in order to determine an amount of material removed from the surface of the substrate 10, or to determine when the surface of the substrate 10 becomes even. The light source 152, and the sensor or the detectors 154, can be connected to a controller 160 comprised of a general purpose programmable digital computer or a processor. The controller 160 performs a control program for controlling a display section 170 for displaying data, an inputting member 190 for inputting the data, a storing member 180 for storing the data, and a driving member 200 for driving the rotation platen 110 and the carrier head 140.

The controller 160 can be programmed to store a measured intensity value the endpoint detecting member 150 and to display the measured intensity value on the display section 170. The controller is also programmable to calculate an initial thickness of a layer to be polished, a polishing rate, an amount removed from the layer by polishing, and a remaining thickness of the layer from the measured intensity value, and to detect the polishing endpoint.

Figure 3:
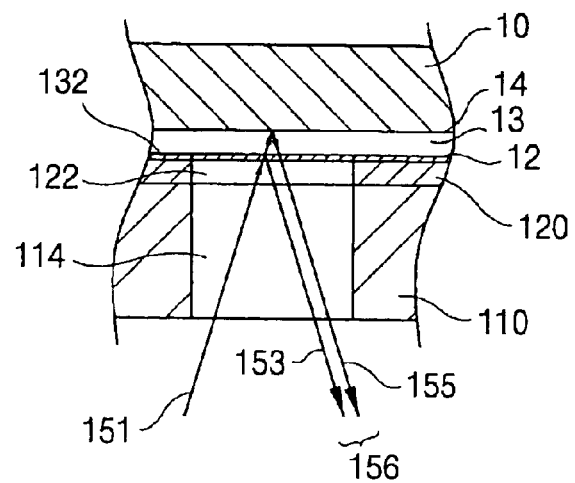
FIG. 3 is a partial cross-sectional view of a polishing station of a CMP apparatus having an endpoint detection system for an interferometer measurement of a substrate.

FIG. 3 is a partial cross-sectional view of a polishing station of the CMP apparatus having the endpoint detection system for the interferometer measurement of the substrate.

Referring FIG. 3, the substrate 10 comprised of a wafer, such as a silicon wafer, includes an overlying thin film structure 13 formed on the surface 14 of the substrate 10. The thin film structure 13 includes a transparent or partially transparent outer layer such as a dielectric layer (for example, an oxide layer), and can also include at least one underlying layer that is transparent, partially transparent or reflective.

In the end point detecting member 150, a portion of the light beam 151 applied to the substrate 10 is partially reflected at the surface 12 of the thin film structure 13 to form a first reflected light beam 153. However, the remaining portion of the light beam 151 is transmitted through the thin film structure 13. At least some portion of the transmitted light beam 151 is reflected at the surface 14 of the substrate 10 to form a second reflected light beam 155. The first reflected light beam 153 and the second reflected light beam 155 interfere with each other constructively or destructively depending on their phase relationship.

One phase relationship of the interference beam 156 is expressed as a function of a refraction index and a thickness of the layer in thin film structure 13, a wavelength of the light beam 151, and an incidence angle ($\alpha$1).

The interference beam 156 advances back to the sensor 154 through the slurry 132 and the transparent window 122. When the first reflected light beam 153 and the second reflected light beam 155 have identical phases, the first and the second reflected light beam 153 and 155 interfere constructively with each other, and then a maximum value (lmax1) is detected on the sensor 154. On the other hand, when the first reflected light beam 153 and the second reflected light beam 155 are out of phase, the first and the second reflected beam 153 and 155 interfere destructively with each other, and then a minimum value (lmin1) is detected on the sensor 154. Other phase relationships can be expressed as an interference signal between the maximum value (lmax1) and the minimum value (lmin1) shown on the sensor 154. Such a result is a signal output from the sensor 154 that varies as the thickness of the layer, or the sort of layer of the thin film structure 13, is varied.

Because the thickness of the layer or the sort of layer of the thin film structure 13 changes in accordance with time while polishing the substrate 10, the signal output from the sensor 154 also varies with a lapse of time. The time varying output of the sensor 154 can be referred to as a reflectance (reflection ratio) measurement trace.

When the substrate 10 having a layer or layers of the thin film structure 13 without a pattern is polished, a data signal output by the sensor 154 is periodical due to the interference between a portion of the reflected light beam from the surface of thin film structure 13 and a portion of reflected light beam from the underlying layer or layers of the thin film structure 13 or from the substrate 10.

Figure 4:
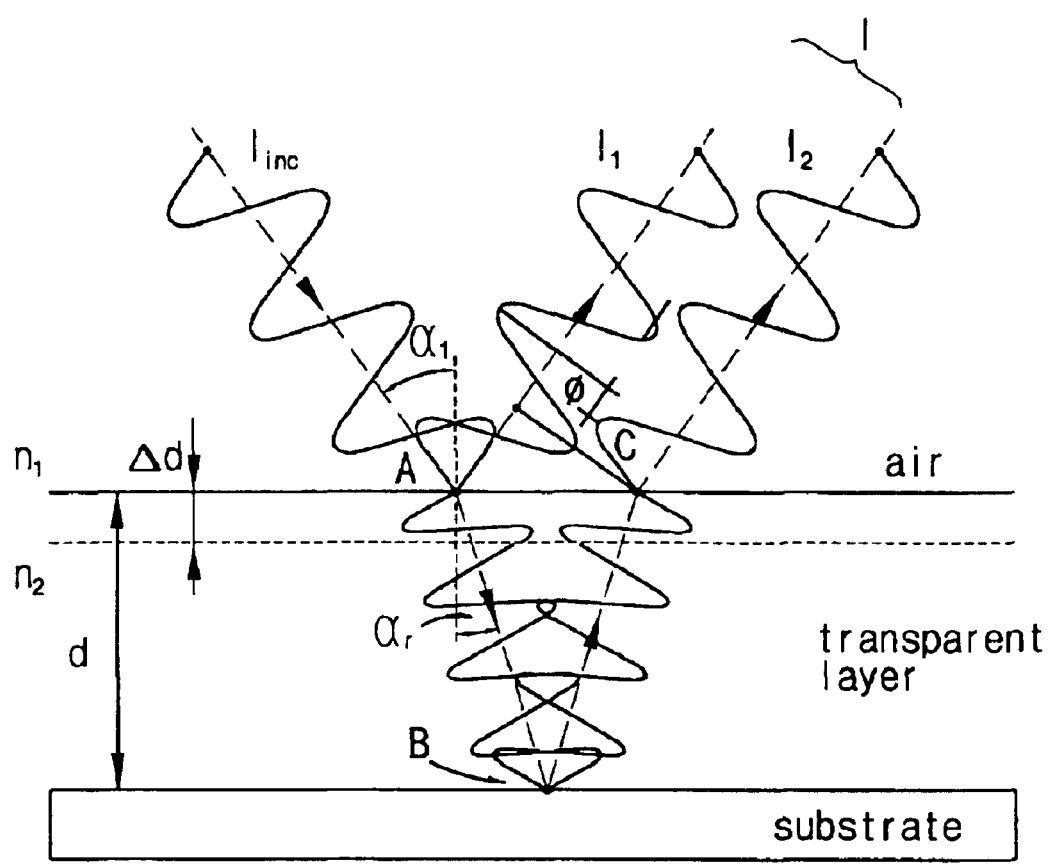
FIG. 4 is a schematic cross-sectional diagram illustrating a principle of the interferometer measurement by the endpoint detection system in FIG. 3.

FIG. 4 is a schematic cross-sectional diagram illustrating a principle of the interferometer measurement by the endpoint detection system in FIG. 3.

Referring FIG. 4, an incident light beam (linc) is projected to a first surface by an incidence angle ($\alpha 1$), and a portion of the incident light beam (linc) is reflected at a point (A) to form a first reflected light beam (l1). Another portion (the remaining portion) of the incident light beam (linc) is transmitted into a transparent layer of which the refractive index is n2, and is reflected at a point (B). The light beam reflected at the point (B) passes through a point (C) to form a second reflected light beam (l2). The first reflected light beam (l1) and the second reflected light beam (l2) have a phase difference $\Phi$ according to the difference of the light path.

When an initial thickness of a transmitted layer is $d_0$, a polishing rate is $r_r$, a polishing time is t, a remaining thickness after the polishing process d(t) can be calculated from the following equation (1).

$$d(t)=d_0-r_r t \qquad \text{equation (1)}$$

Hence, when a refractive index is n2 and a light wavelength is $\lambda_0$, a phase difference $\Phi$ (t) can be calculated from the following equation (2).

$$\Phi(t) = \frac{2\pi}{\lambda_0} 2n_2 d(t) \qquad \text{equation (2)}$$

So, an interference light beam is represented as a function of the reflection rate trace calculated from the following equation (3).

$$I(t) = I1 + I2 = 2\left(\sqrt{(I1+I2)}\right)\cos(\Phi(t)) \qquad \text{equation (3)}$$

Therefore, the phase difference is varied in accordance with the thickness of the transmitted layer decreases, which results in variance of an interference wave.

Figure 5:
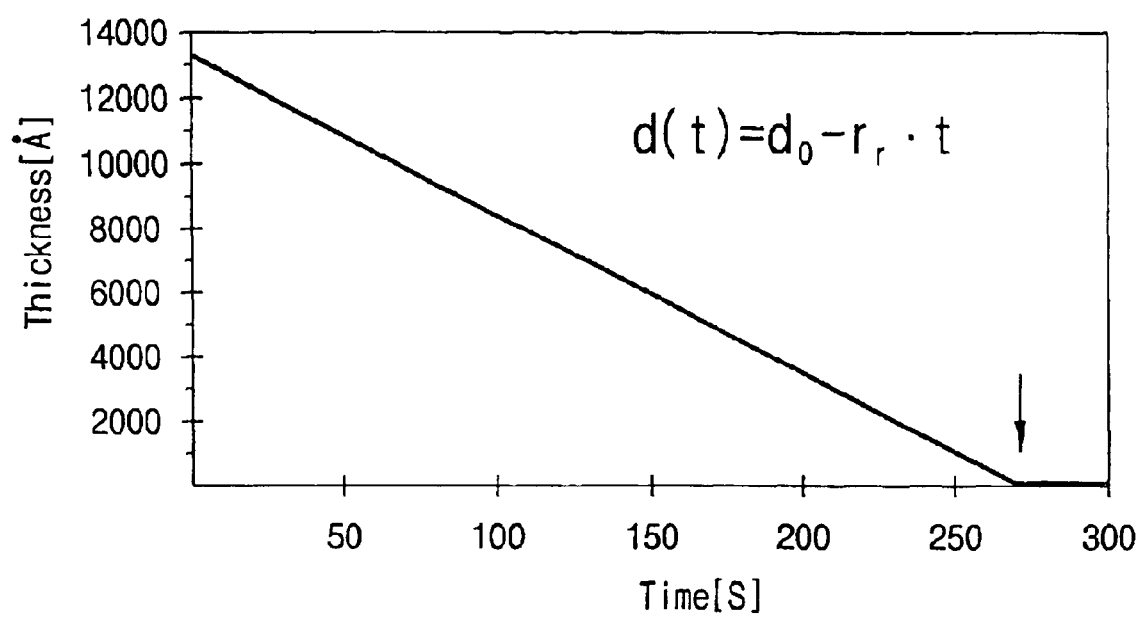
FIG. 5 is a graph showing a relation between a thickness of a film to be polished and a polishing time of the film that is polished at a predetermined polishing rate.
Figure 6:
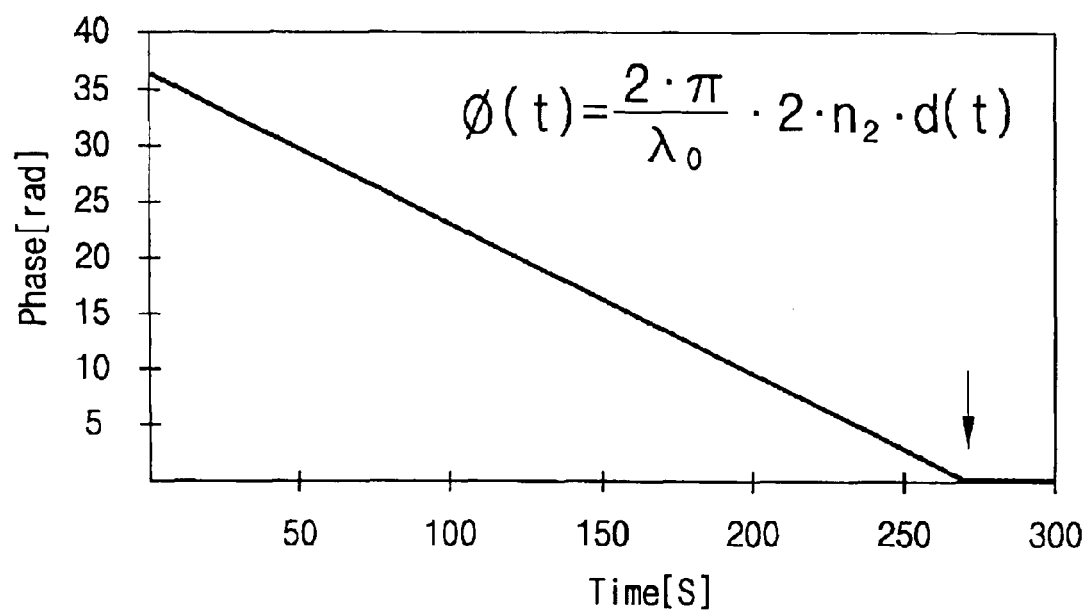
FIG. 6 is a graph showing a relationship between a phase difference and the polishing time of a film to be polished.
Figure 7:
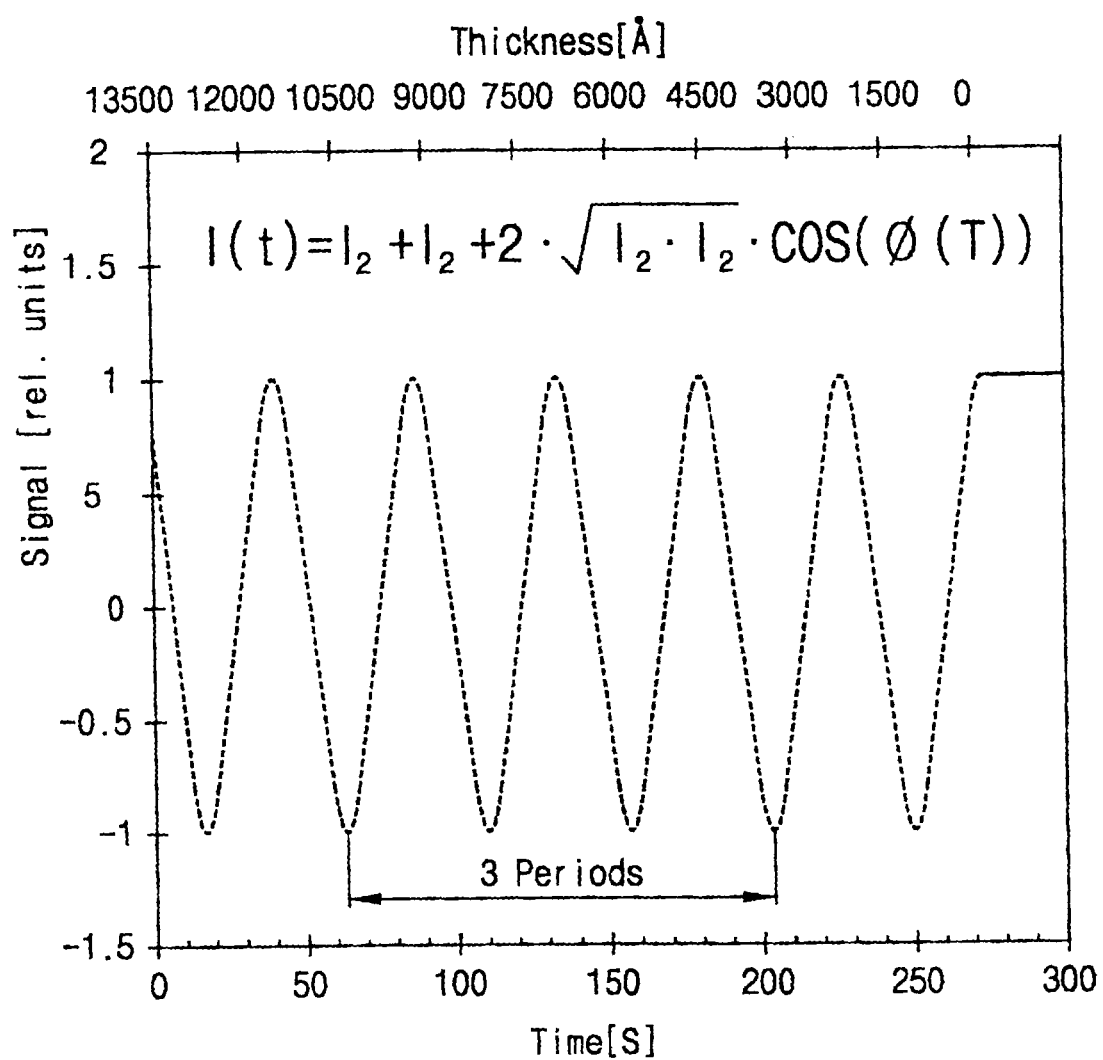
FIG. 7 is a graph illustrating a reflection ratio trace produced by a measurement with the endpoint detection system concerning a test sample.

For example, where the initial thickness is approximately 13,500 Å, the refractive index is approximately 1.46, the light wavelength is approximately 670 nm, and the removal rate is approximately 50 Å/sec, then the variance of the thickness according to the polishing time is shown in FIG. 5, and the variance of the phase is shown in FIG. 6. Also, the reflection ratio trace is shown in FIG. 7 according to the polishing time.

Figure 8:
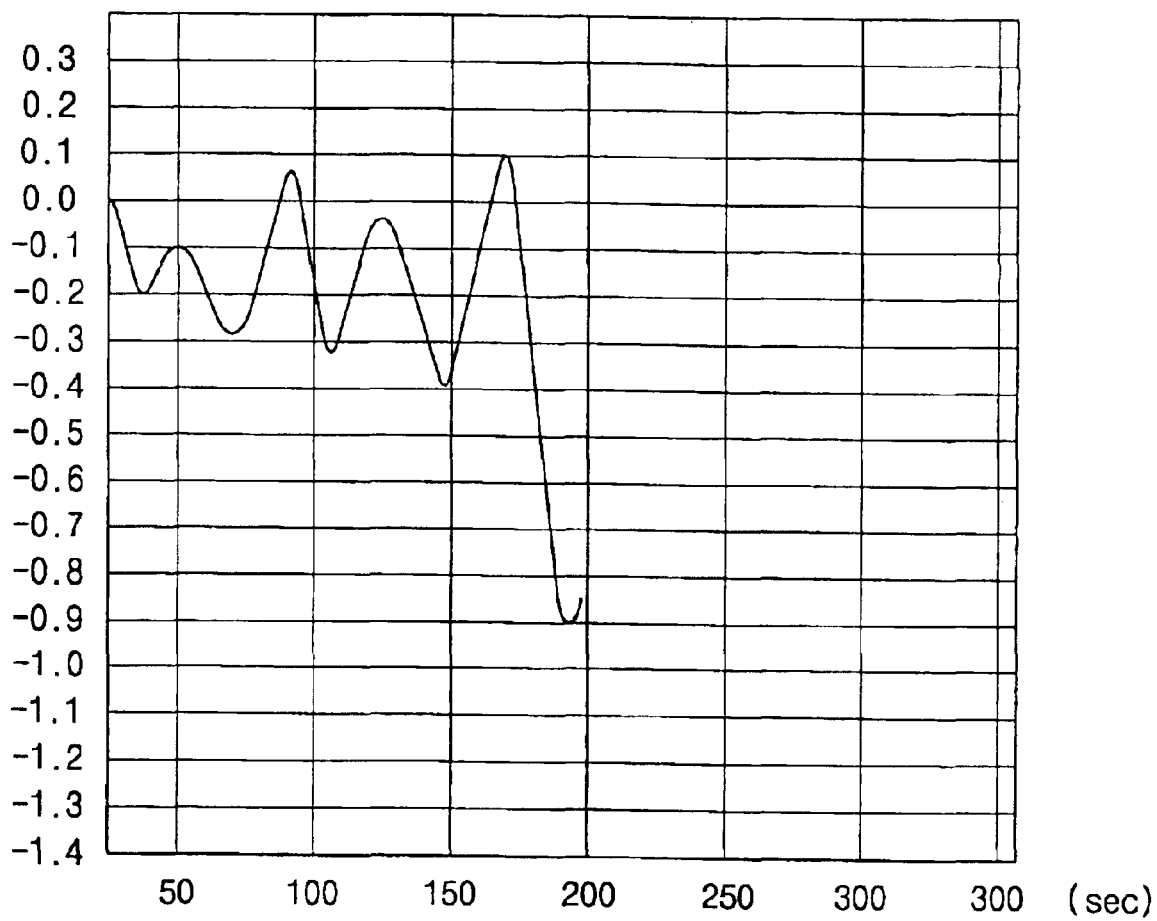
FIG. 8 is a graph illustrating a reflection ratio trace produced by a measurement of the end point detection system of a wafer where a practical pattern is formed.

FIG. 8 is a graph illustrating the reflection ratio trace produced by a measurement of the end point detection system for a wafer where a practical pattern is formed.

Referring to FIG. 8, the reflection ratio trace obtained from the endpoint detecting member of the practical CMP apparatus is analogously displayed onto the screen of the display. In other words, even though the amplitude of the trace shown in FIG. 7 is regular, in practice, the amplitude of the trace is not regular, as shown in FIG. 8. The trace in FIG. 7 is obtained from a test sample having an even surface, while the trace in FIG. 8 is obtained from a light beam reflected from a wafer on which a pattern is formed.

Therefore, the information about the thickness is obtained from data produced by normalizing the practically obtained reflection ratio trace (e.g., FIG. 8).

Figure 9:
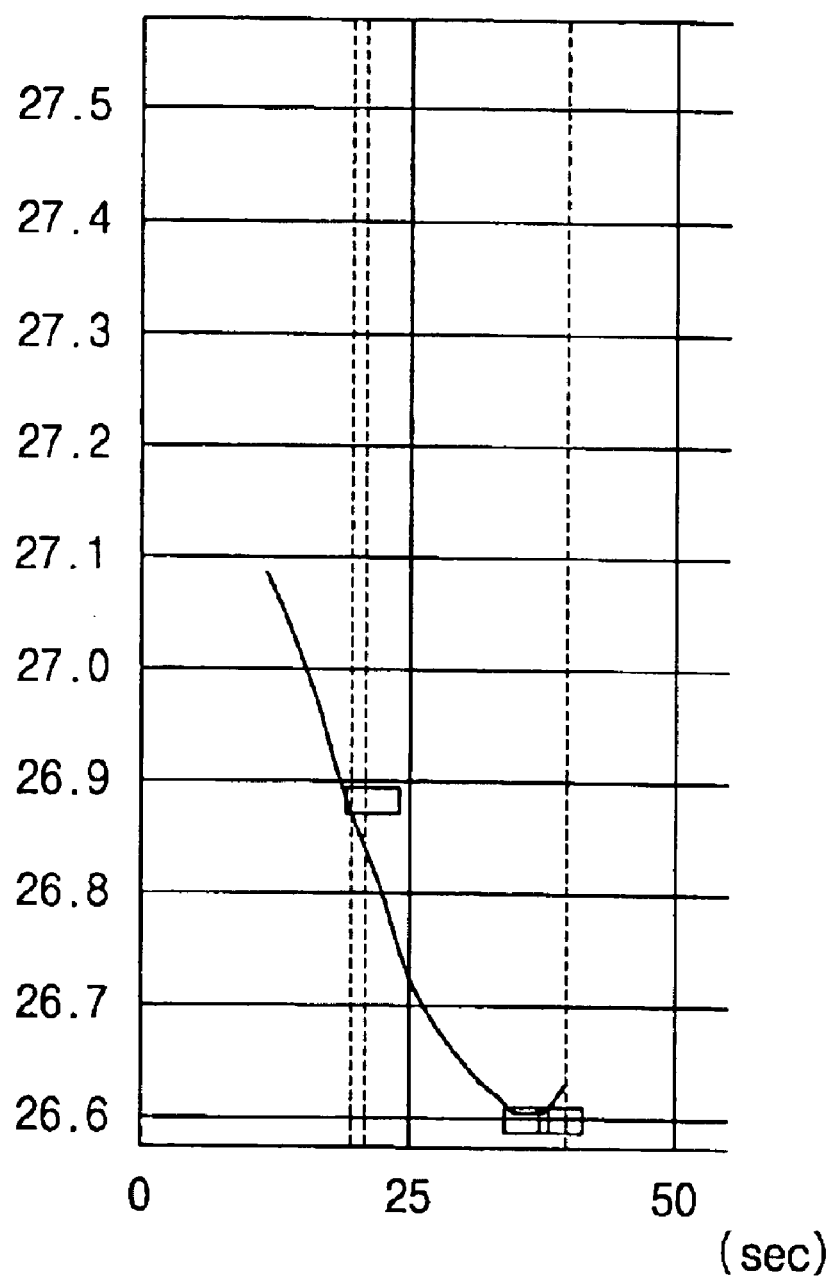
FIGS. 9 and 10 are graphs showing reflection ratio traces for comparing each reflection ratio trace of two films to be polished whose thicknesses are different through the same deposition process.
Figure 10:
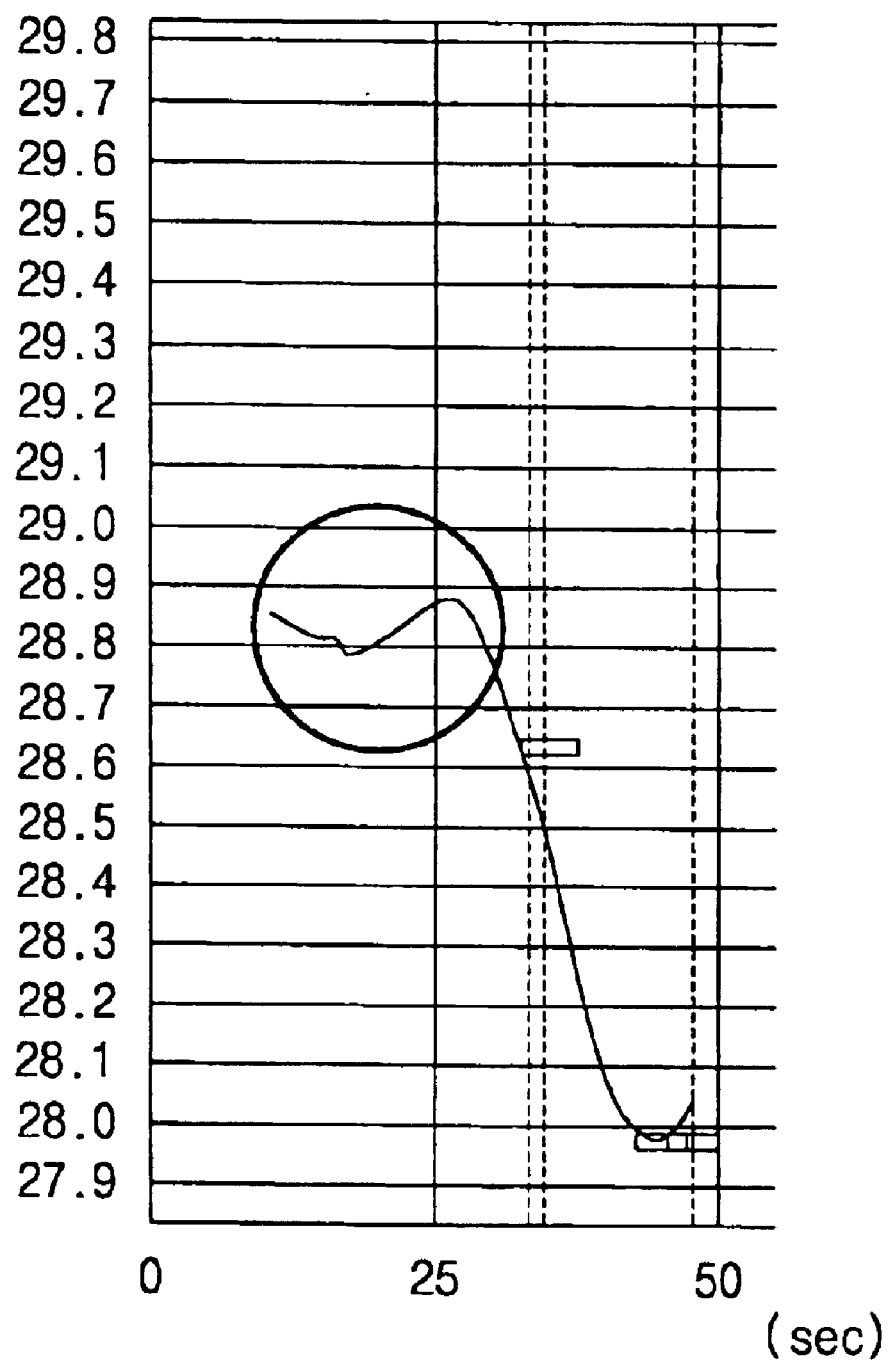

FIGS. 9 and 10 illustrate the reflection ratio trace of the endpoint detecting member for identical oxide films whose initial thickness are different each other.

In FIGS. 9 and 10, an oxide film is formed by depositing a first thin film composed of $SiO_2$ formed using a high density plasma on a wafer to have a thickness of approximately 5,500 Å, and by depositing a second thin film composed of $SiO_2$ formed using PETEOS on the first thin film to have a thickness of approximately 2,000 Å, and then annealing the first and the second thin films. Hence, an oxide film having an average thickness (Tox) of approximately 5,562 Å (an average thickness measured for nine wafers), before a CMP process, is applied as the oxide film in FIG. 9, while an oxide film having an average thickness of approximately oxide film 5,723 Å (an average thickness measured for nine wafers), before the CMP process, is applied as the oxide film in FIG. 10. That is, when a thickness difference before the CMP process is approximately 161 Å, the reflection ratio trace in FIG. 10 is delayed by about 8 seconds at a circular portion, in comparison with FIG. 9, and one additional peak is formed in FIG. 10.

Figure 11:
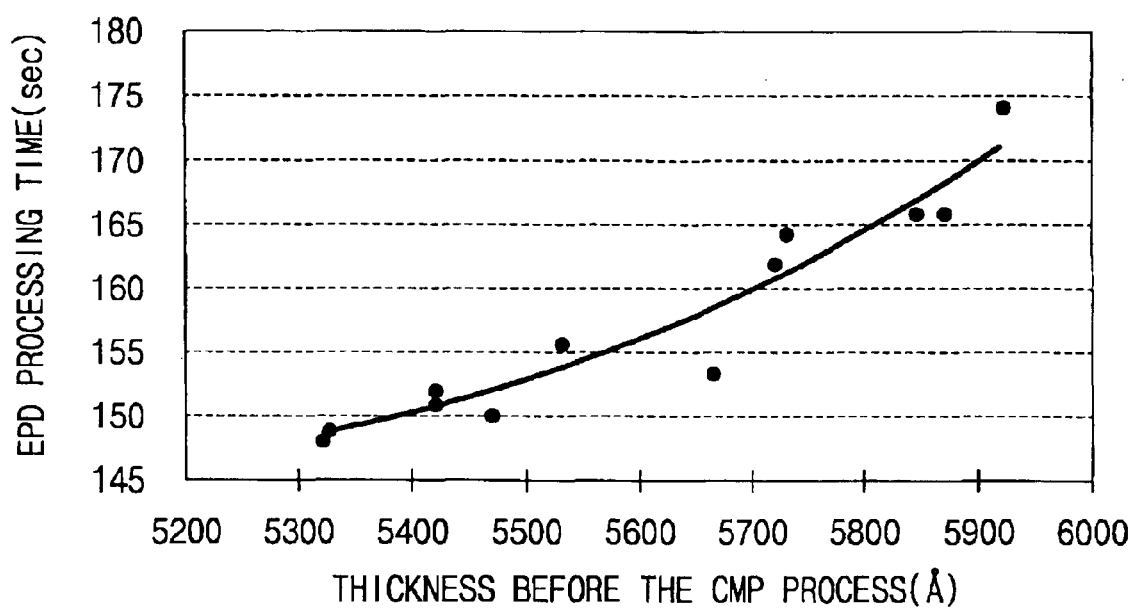
FIG. 11 is a graph showing a relation between an end point detection processing time and an initial thickness.

FIG. 11 illustrates a relationship between the endpoint detection time and the corresponding initial thickness before the CMP process, when the CMP process is performed as an STI CMP of a 128M SDRAM.

As shown in FIG. 11, the endpoint detection time proportionally increases according to a second order function as the initial thickness before the CMP process increases.

Figure 12:
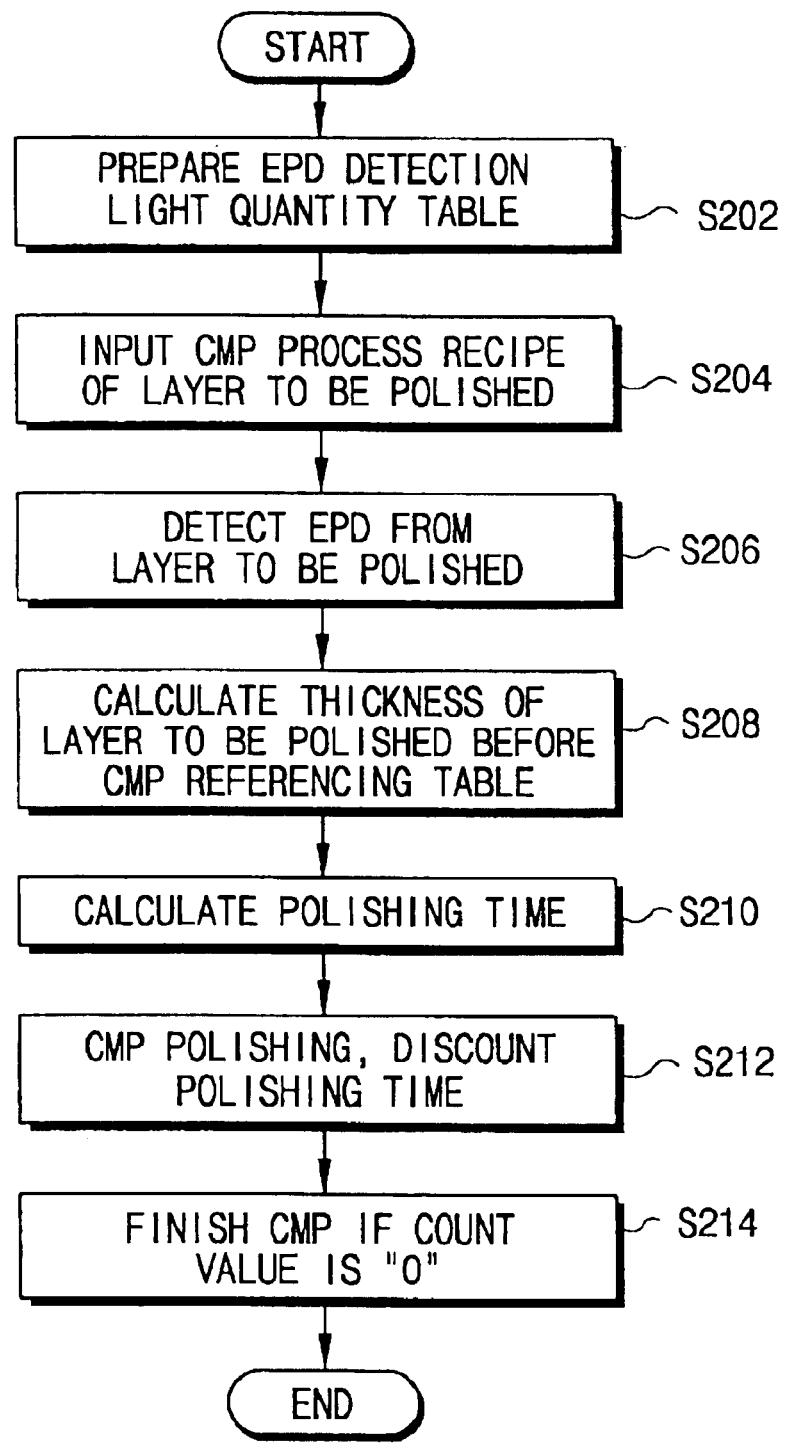
FIG. 12 is a flow chart illustrating a control program of the CMP apparatus of FIG. 1.

FIG. 12 is a flow chart illustrating a control program of the CMP apparatus.

Thus, as shown in FIG. 12, the controller 160 is programmed so that the controller 160 calculates the initial thickness of the layer to be polished from light quantity data detected through the endpoint detecting member 150, calculates the polishing time according to the calculated initial thickness, and then controls the endpoint digitally. Such an operation will be described as follows.

At first, a "polishing time database" of initial thicknesses for the layer to be polished, and corresponding polishing times, is provided. Also, an "endpoint detection light quantity table" of initial light quantities detected by an endpoint detecting means and corresponding initial thicknesses of a layer to be polished, is prepared. Then, the database and the table are stored in the storing member 180 of the CMP apparatus (step S202). In this case, the table is prepared on the basis of the data obtained from a result of measurements from one or more previous polishing processes in accordance with a recipe history of the layer to be polished.

For example, in case of an entire process for a 256M DRAM, since the CMP process for an oxide layer or a polysilicon layer is previously set, and data of a deposition process for layers to be polished is also set, a table of detection data for an initial thickness and a light quantity of a corresponding endpoint detection can be prepared based on the set data.

When the wafer to be polished is loaded in the CMP apparatus 100, a polishing process recipe for the layer to be polished is inputted through the inputting member 190 (step S204).

The light quantity reflected from the layer to be polished is detected by using the endpoint detecting member 150 after projecting light onto the semiconductor wafer (step S206).

The controller 160 calculates the thickness of the layer to be polished before the polishing process i.e., the initial thickness from the detection signal according to the detected light quantity with reference to the endpoint detection light quantity table stored in the storing member 180 (step S208). Then, the controller 160 calculates the polishing time, from the calculated initial thickness to a desired thickness (the polishing endpoint).

Figure 13:
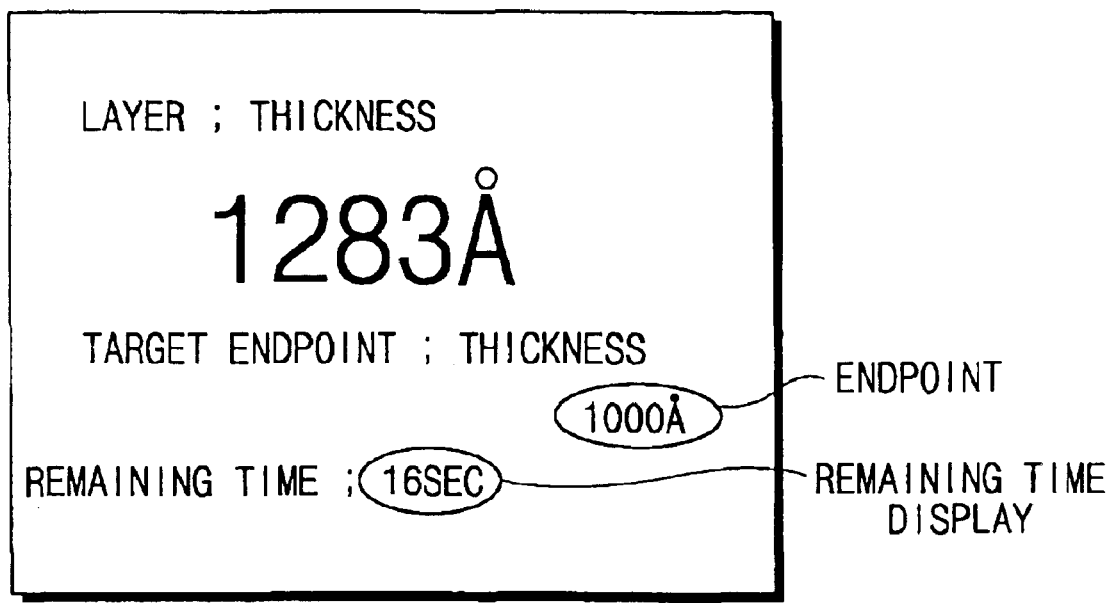
FIG. 13 is a front view showing a screen for displaying the initial thickness and the polishing time in digital values.

FIG. 13 is a front view showing the screen for displaying the initial thickness and the polishing time in digital values.

As shown in FIG. 13, the calculated initial thickness, the digital values of the desired thickness and the remaining polishing time are displayed on the display section 170.

The controller 160 controls the driving member 200 to detect the endpoint by counting down or decrementing the time and calculating the remaining polishing time during the polishing process for the layer to be polished (step S212). The remaining polishing time is displayed on the display section 170. Because the remained polishing time is displayed as a digital value, an operator can easily recognize the remaining time, so the convenience and efficiency of the operation can be improved.

The controller 160 detects the endpoint when the remaining polishing time becomes '0', and controls the driving member 200 to stop the polishing process (step S214).

After the polishing process, the controller 160 updates a stored table value using the initial thickness of the layer to be polished, the calculated polishing time, a final result value etc., and the controller 160 reflects the updated value in an identical polishing process having the same recipe.

As described above, the result of a polishing process is fed back in order to reflect the result in calculating an initial thickness. Accordingly, a polishing time of a subsequent polishing process, a minor variation in polishing process circumstances, such as a CMP device, a polishing pad, a slurry, etc., can be adaptively accommodated, so the end point detection is improved.

Accordingly, a CMP apparatus includes one endpoint detector and calculates an initial thickness of a layer to be polished accurately by using light quantity data from one end point detector. In addition, the CMP apparatus controls a polishing endpoint automatically by calculating a polishing time by using the calculated initial thickness. Therefore, an accurate control of a polishing endpoint can be achieved by simply adding a program to a controller of conventional CMP apparatus, and conditions and an efficiency of the operation can be improved.

This invention has been described above with reference to the exemplary embodiments. It is evident, however, that many modifications and variations will be apparent to those having ordinary skill in the art in light of the foregoing description. Accordingly, the present invention embraces all such alternative modifications and variations as fall within the spirit and scope of the appended claims.

What is claimed is:

1. A method for controlling a chemical-mechanical polishing apparatus for polishing a layer formed on a lower layer on a semiconductor wafer, the method comprising:

preparing an endpoint detection light quantity table of initial light quantities detected by an endpoint detecting means and corresponding initial thicknesses of a layer to be polished, in accordance with a polishing process recipe for the layer to be polished;

inputting the polishing process recipe of the layer to be polished into a storage device of the chemical-mechanical polishing apparatus;

projecting a light onto the semiconductor wafer;

detecting a light quantity reflected from the layer to be polished using the endpoint detecting means;

calculating an initial thickness of the layer to be polished from a detection signal indicating the detected light quantity with reference to the endpoint detection light quantity table;

calculating a polishing time to polish the layer to be polished, from the calculated initial thickness to a desired final thickness;

polishing the layer to be polished;

detecting an endpoint by counting down the calculated polishing time while polishing the layer to be polished; and stopping polishing the layer when the endpoint is detected.

2. The method of claim 1, wherein the endpoint detection light quantity table includes data of a deposition process of the layer to be polished and a history of a CMP polishing process.

3. The method of claim 1, further comprising the step of updating data of the endpoint detection light quantity table by feeding back measurement data of a completed polishing process after stopping the polishing process.

4. The method of claim 3, further comprising displaying digital values of the calculated initial thickness and the calculated polishing time before polishing the layer.

5. A chemical-mechanical polishing apparatus for polishing a layer formed on a lower layer on a semiconductor wafer, the apparatus comprising:

storing means for storing an endpoint detection light quantity table of initial light quantities detected by an endpoint detecting means and corresponding initial thicknesses of a layer to be polished, in accordance with a polishing process recipe for the layer to be polished;

inputting means for inputting the polishing process recipe of the layer to be polished into the storing means;

endpoint detecting means for detecting a light quantity reflected from the layer to be polished by projecting a light to the semiconductor wafer; and controlling means for calculating the initial thickness of the layer to be polished from the detected light quantity data with reference to the end point detection light quantity table, for calculating a polishing time to polish the layer to be polished from the calculated initial thickness to a desired final thickness, for detecting an end point by counting down the calculated polishing time while polishing the layer to be polished, and for stopping polishing the layer when the end point is detected.

6. The chemical-mechanical polishing apparatus of claim 5, further comprising display means for displaying digital values of the calculated thickness and the polishing time on a screen before the polishing process.

7. The chemical-mechanical polishing apparatus of claim 6, wherein the endpoint detecting means includes a light source and a light detector.

8. The chemical-mechanical polishing apparatus of claim 6, further comprising:

a rotation platen; and a polishing pad on a top surface of the rotation platen, the semiconductor wafer being disposed on the polishing pad, wherein said rotation platen includes an aperture, and wherein said polishing pad includes a window aligned with said aperture.

9. The chemical-mechanical polishing apparatus of claim 8, wherein the endpoint detecting means includes a light source and a light detector, and wherein the light source is arranged to project the light onto the semiconductor wafer through the aperture of the rotation platen and the window of the polishing pad.

10. A method of chemical mechanical polishing a layer on a semiconductor wafer, the method comprising:

projecting a light onto the semiconductor wafer, including a layer to be polished;

detecting a light quantity reflected from the layer;

calculating an initial thickness of the layer from the detected light quantity;

calculating a polishing time to polish the layer from the calculated initial thickness to a desired final thickness;

polishing the layer;

detecting a polishing endpoint by counting down the calculated polishing time while polishing the layer; and stopping polishing the layer when the endpoint is detected.

11. The method of claim 10, wherein calculating an initial thickness of the layer includes using the detected light quantity to reference an endpoint detection light quantity table of detected light quantities and corresponding initial layer thicknesses.

12. The method of claim 10, wherein calculating the polishing time includes using the calculated initial thickness to reference a polishing time database of initial thicknesses for the layer and corresponding polishing times.

* * * * *